March 1, 1966  R. A. WHITLOCK ETAL  3,237,640
FLOW CONTROL APPARATUS
Filed Sept. 23, 1963  2 Sheets-Sheet 1

Inventors
Robert A. Whitlock
Loren D. Johnson
By
McCanna, Morsbach & Pillote
Attorneys Fig. 3.  Fig. 4.  Fig. 5.

Inventors
Robert A. Whitlock
Loren D. Johnson
By McCanna, Morsbach & Pillote
Attorneys

United States Patent Office 3,237,640
Patented Mar. 1, 1966

3,237,640
FLOW CONTROL APPARATUS
Robert A. Whitlock and Loren D. Johnson, Rockford, Ill.,
assignors to AquaMatic Inc., Rockford, Ill., a corporation of Illinois
Filed Sept. 23, 1963, Ser. No. 310,594
16 Claims. (Cl. 137—399)

This invention relates to improvements and control systems for water trtatment apparatus of the type employing a treatment tank containing a bed of exchange material and a regenerant tank for periodically regenerating the bed of exchange material.

An important object of this invention is to provide a control system for a water treatment apparatus having an improved regenerant control apparatus for controlling the flow of a pre-selected quantity of regenerant to the treatment tank during regeneration of the latter, and which regenerant control apparatus can be located at any convenient location remote from the regenerant tank.

Another object of this invention is to provide a control system for water treatment apparatus which control system employs a regenerant control valve operable to shut off the flow of regenerant from the regenerant tank to the treatment tank when the regenerant level in the regenerant tank reaches a pre-selected lower level, and a timer controlled main valve which is operable to time the refill of the regenerant tank to thereby introduce a pre-selected quantity of liquid into the regenerant tank for a subsequent cycle of regeneration.

Another object of this invention is to provide a control system for a water treatment apparatus which achieves improved regenerant economy.

A further object of this invention is to provide a control system for water treatment apparatus which is operable to introduce the regenerant into the treatment tank to regenerate the bed of exchange material in the treatment tank and provide both a slow rinse of the bed to remove most of the regeneration effluent and a rapid rinse of the bed to remove the excess regenerant, which control system utilizes a portion of the rapid rinse water to refill the regenerant tank.

Still another object of this invention is to provide an improved control valve for a water treatment apparatus and which employs a single axially movable valve member to provide four different flows through the treatment tank, including downflow during service; upflow during backwash; downflow during regeneration and slow rinsing of the bed of exchange material; and a downflow rapid rinse of the bed of exchange material.

These, together with other objects and advantages of this invention will be more readily appreciated as the invention becomes better understood by reference to the following detailed description when taken in connection with the accompanying drawings wherein.

A water treatment apparatus employing the control system of the present invention is diagrammatically shown on FIG. 1 and includes a treatment tank 10 having a bed of exchange material B therein and upper and lower tank connections 11 and 12 in the tank respectively above and below the bed of exchange material. As shown, the lower tank connection is connected to a distributor 12'. An upper distributor may also be provided, if desired. The treatment apparatus also includes a regenerant tank 14 which is adapted to receive a quantity of regenerant R such as sodium chloride for use in regenerating the bed of ionic exchange material in the treatment tank. A regenerant line 15 extends downwardly in the tank to a level adjacent the bottom and a means is provided for preventing solid regenerant from entering the regenerant line 15 while permitting free flow of dissolved regenerant. As shown, a slotted tube 16, covered with a distributor bed of gravel or the like, is provided on the lower end of the regenerant line to prevent solid regenerant from entering the line. However, the regenerant dissolved in the tank by the water can freely enter the slotted tube or distributor 16 for passage to the regenerant line.

The control system for the water treatment apparatus includes a main control valve 21 which is operable to control the various flows of fluid to and from the treatment tank 10, an ejector 22 for drawing regenerant from the regenerant tank, a regenerant control apparatus 23 which is operable to control the flows of fluid from the regenerant tank to the treatment tank, and a timer controlled apparatus 24 for operating the valve 21 through the successive phases of the regeneration cycle. In general, the regenerant control 23 is operable to terminate the flow of regenerant from the regenerant tank 14 to the treatment tank, when the liquid in the regenerant tank falls to the level of the lower end of the regenerant line and the valve 21 is operable under the control of the timer mechanism 24 to time the refilling of the regenerant tank to introduce a preselected quantity of liquid into the regenerant tank for a subsequent regeneration cycle. The main valve is advantageously arranged to control the supply of liquid to the regenerant tank during one of the phases of the regeneration cycle.

The main valve 21 comprises a casing which, in the embodiment herein shown, is formed in three separable sections designated 25, 26 and 27. The lower casing section 27 is attached to the lower end of the intermediate casing section 25, and is sealed thereto as by an O-ring 28. The upper casing section 26 is detachably secured to the upper end of the intermediate casing section 25, as by fasteners 29 (FIG. 2) and an O-ring 30 is provided for sealing the upper section to the intermediate section. Obviously, the valve casing could be divided into a different number of sections, or formed in one piece, if desired. The main valve casing defines an elongated valve chamber having an inlet compartment 31 intermediate its ends, and which compartment communicates with an inlet supply passage 32 (FIG. 2), adapted for connection to the supply of raw water to be softened. A first tank compartment 33 is spaced axially from the inlet compartment 31 and communicates with a first tank connecting passage 34. The tank connecting passage 34 is connected through a line 35 to the upper tank connection 11 at the upper end of the treatment tank. The valve casing has a general cylindrical portion 36 intermediate the inlet compartment and the first tank compartment 33 and which defines a valve seat therebetween. The casing also includes a service compartment 38 which is spaced axially from the other side of the inlet compartment 31 and which communicates with a service passage 39 (see FIG. 2) and which service passage is adapted for connection to a softened water delivery line. A valve seat 40, herein shown in the form of a cylindrical wall portion, is disposed between the inlet compartment 31 and the service compartment 38. The valve also includes a second tank compartment 41 spaced axially from the service compartment 38, and which second tank compartment communicates with a second tank connecting passage 42 and through line 43 (FIG. 1) with the distributor 12' at the other end of the treatment tank 10. The valve also includes first and second drain compartments 45 and 46, which are respectively spaced axially from the first and second tank compartments 33 and 41. Annular valve seats 47 and 48 are respectively disposed between the first tank compartment 33 and first drain compartment 45, and between the second tank compartment 41 and the second drain compartment 46.

Figure 6:
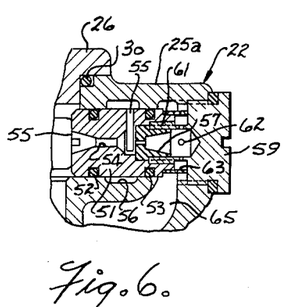
FIGURE 6 is an enlarged sectional view through the ejector.

The ejector 22 for drawing regenerant from the regenerant tank is conveniently mounted in a boss 25a on the intermediate casing section 25. The ejector may be of any suitable construction and, in the present embodiment best shown in FIG. 6, includes a body 51 which is insertable into a bore in the boss 25a and which is sealed thereto at axially spaced points by O-rings 52 and 53. The ejector body includes a throat 54, having an outlet 55 in communication with the first tank compartment 33, and a throat inlet 55, which opens laterally of the valve member and communicates with a regenerant inlet compartment 56 in the boss 25a. The ejector also includes a nozzle 57, having a restricted opening therein for passing a stream of liquid through the throat 54 and thereby produce a low pressure at the throat inlet 55. The nozzle 57 is conveniently formed separately from the ejector body 51 and is detachably retained in position by a cap 59 having an externally threaded tubular extension 61. The cap 59 has raw water inlet openings 62 therein for supplying raw water to the nozzle, and a screen 63 is preferably provided around the inlet openings to block the entrance of foreign matter which could plug the ejector nozzle. Water is supplied to the inlet opening 62 of the ejector through a passage 65 that communicates with the supply compartment 31, and the regenerant inlet compartment 56 is connected through a regenerant feed line 67, to the regenerant control valve 23. In order to simplify illustration of the system, the regenerant control apparatus 23 is shown spaced somewhat from the main valve. However, in practice, the regenerant control is preferably mounted closely adjacent the main valve and may be connected directly thereto as by a short nipple designated 67a in FIG. 1. When mounted in this manner the regenerant control will be located so that the nipple 67a is at a level adjacent the ejector 22, and will be disposed at one side of the ejector and alongside the main valve casing.

Figure 7:
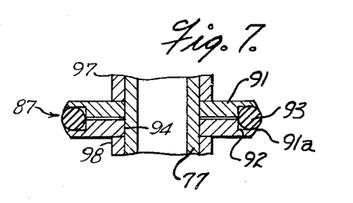
FIGURE 7 is an enlarged fragmentary sectional view illustrating one of the valve elements and the mounting of the valve element on the movable valve stem.

A single axially movable valve member 75 is provided for controlling the various flows of fluid between the treatment and regenerant tanks. The valve member is movable through four different axial positions to control the several flows in the different phases of the regeneration cycle, including the service, backwash, regeneration and rapid rinse phases. In order to simplify the external piping of the system, the stem of the valve member is preferably arranged to provide a passage for passing fluid lengthwise of the valve member. Thus, in the embodiment illustrated, the valve member includes an upper stem portion 76 and a lower tubular stem portion 77, which stem portions are conveniently threadedly interconnected. The upper end of the stem portion 76 slidably extends through a gland 79 at the upper end of the valve casing. An apparatus, herein shown in the form of a link 81 and crank wheel 82, is provided for moving the stem axially to each of the four different service, backwash, regeneration and rapid rinse positions. The valve member has a plurality of valve elements mounted thereon for cooperation with the various seats and, in the valve shown, six valve elements designated 84–89 are mounted on the stem at axially spaced points thereon. The valve elements, while of different size to fit the corresponding seats, are preferably similarly constructed. As best shown in FIG. 7, the valve elements each comprise a pair of discs 91 having grooves 92, in the registering faces thereof, adjacent the outer periphery of the discs. A resilient gasket, such as an O-ring 93 is disposed in the groove and the grooves are formed with an inwardly inclined lip portion 91a, to engage the outer face of the O-ring and retain the same in the groove. The discs have a central opening 94 for receiving the tubular member 77, and the several valve elements are maintained in proper axial spaced relation by tubular sleeves 95–99 (see FIG. 1). The upper valve element 84 abuts against the end of upper stem portion 76 and a nut 101 is threaded on the lower end of the tubular stem portion 77, to clamp the valve elements and spacers in assembled relation. As shown in FIG. 1, the lower end of the tubular stem 77 is in open communication with the second drain compartment 46, and a lateral opening 105 is provided in the upper end of the tubular stem portion to communicate with the space between the valve elements 84 and 85. The passage in the tubular stem 77 functions to pass fluid from the upper drain compartment 45 to the lower drain compartment 46, during the backwash phase of the regeneration cycle and, moreover, functions to pass fluid from the lower drain compartment 46 upwardly to the refill compartment 68, during the rapid rinse phase of the regeneration cycle. A drain passage 106 communicates with one of the drain compartments, preferably the second drain compartment 46 as shown in the drawings. For reasons described hereinafter, a flow controller 106a is provided in the drain passage to maintain a pre-selected rate of flow during the backwash and rapid rinse phase of the regeneration cycle. The flow controller 106a is preferably of the pressure responsive type which will maintain a substantially constant rate of flow with varying pressure conditions and may conveniently be of the type disclosed in the patent to Kempton No. 2,454,292.

Figures 1, 2, 8:
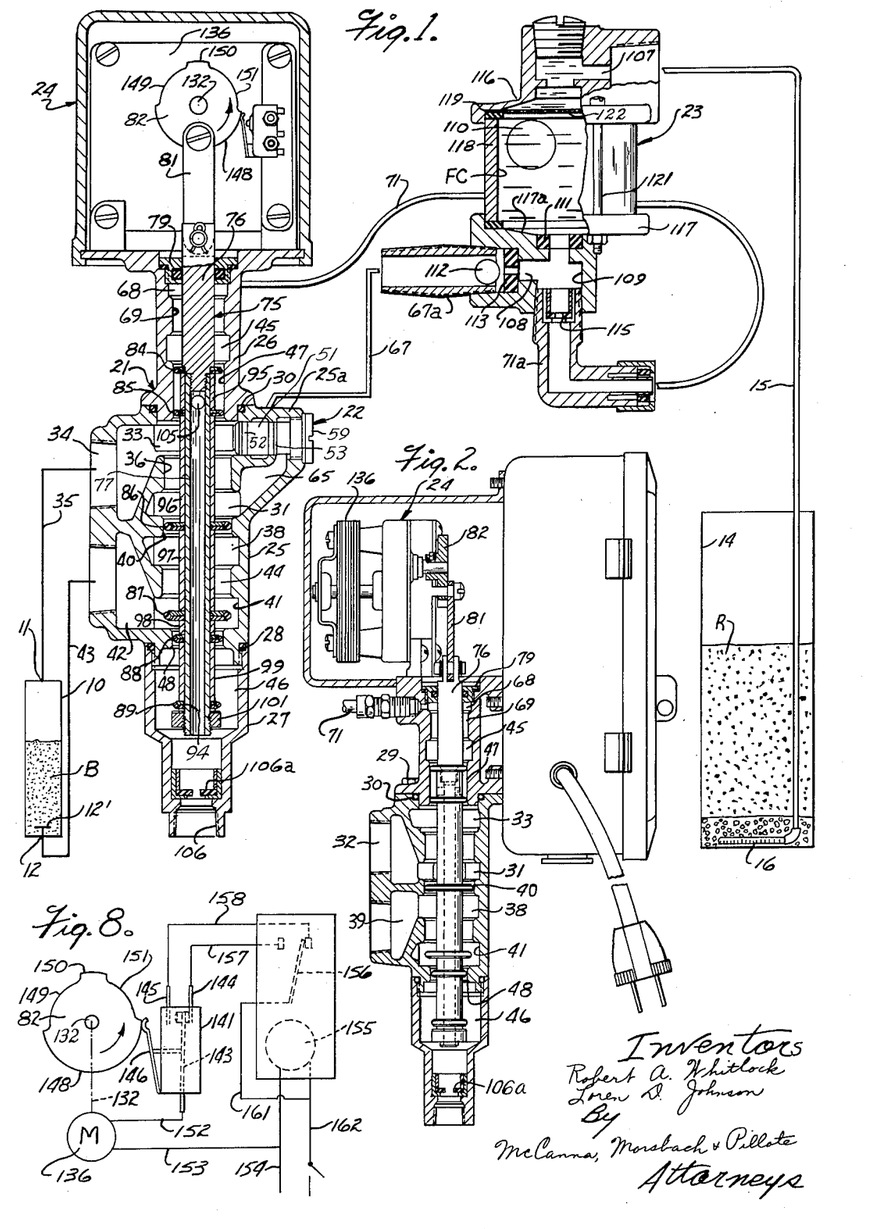
FIGURE 1 is a sectional view through the main valve and regenerant control apparatus, illustrating the parts in their service position.
FIGURE 2 is a longitudinal sectional view through the main valve, taken on a plane transverse to the plane of FIGURE 1.
FIGURE 8 is a diagrammatic view illustrating the electrical controls for the system.

The regenerant control apparatus 23 is best shown in FIG. 1 and in general, includes a casing which defines a float chamber FC, having a regenerant inlet passage 107, connected to the regenerant line 15, and a regenerant outlet passage 108 connected to the regenerant feed line 67 leading to the throat of the ejector. The regenerant control also includes a refill passage 109, which is connected to the refill line 71. A float member 110, conveniently in the form of a buoyant ball, is disposed in the float chamber and cooperates with a seat 111 to block flow to the regenerant passage 67 when the liquid in the float chamber drops to a preselected lower level. A check valve 112 is provided in the regenerant passage 108, and arranged to cooperate with a seat 113 to open for flow from the float chamber to the ejector and to close to prevent return flow through the regenerant line 67 to the float chamber. A flow controller 115, preferably of the pressure responsive type, is provided in the refill passage to regulate the rate of flow of fluid to the regenerant tank and to maintain a substantially constant flow over a wide range of pressure conditions. The flow controlled may be of any suitable type which will operate to maintain a substantially constant preselected flow therethrough over a wide range of pressure conditions and may, for example, be of the type disclosed in the aforementioned patent to Kempton No. 2,454,929.

In the embodiment illustrated, the casing for the float chamber is formed by upper and lower head members 116 and 117, conveniently of similar configuration, which are clamped to an intermediate wall member 118, and sealed thereto as by gaskets 119. The heads and wall members are maintained in assembled relation as by clamping bolts 121 and, conveniently, the wall member may be formed of a transparent material to enable visual inspection of the position of the float 110. A screen or other filter 122 is preferably provided across the upper end of the float chamber to prevent the introduction of foreign matter into the flow chamber and ejector.

The valve seat 111 for the float member is conveniently in the form of an annular ring of resilient material such as rubber and seated in a counter bore in the lower head member 117. As shown, the float member 110 is substantially smaller than the inner dimension of the float chamber and the bottom of the float chamber is tapered as indicated at 117a to aid in guiding the float member onto the seat 111. The seat 113 for the ball check is also conveniently in the form of a toroidal body of resilient material such as rubber and is seated in a counter bore at the inner end of the passage 108. The check valve 112 is in the form of a ball which cooperates with the seat to block return flow from the ejector to the throat chamber. As shown, the flow controller is mounted in a counter bore at one end of the tube fitting 71a, forming a part of the refill tube 71. It is deemed apparent that the refill tube 71 can communicate with the float chamber at various different points therein to refill the float chamber. Thus, the refill line 71 could communicate with the passages in either the upper or lower head members 116 or 117. However, it is preferable to connect the refill line to the lower head member to communicate with the regenerant passage 108 at a point intermediate the seats 111 and 113. When connected in this manner, the refill fluid will positively force the float ball 110 upwardly away from its seat 111 to assure unseating of the float member and will, moreover, reliably purge the air out of the float chamber during refill of the brine tank.

The mechanism 24 for moving the valve stem between its several positions including the service position, backwash position, regeneration position and the rapid rinse position, may be of any suitable type. In the embodiment illustrated, it includes a crank wheel 82 on a shaft 132, which eccentric is connected as through a link 81 to the valve stem 76. The shaft 132 is driven from a suitable motor and speed reducer 136 and a means is provided for controlling the angular movement of the shaft to position the stem in its different axial positions. One such control system is diagrammatically shown in FIGURE 8 and includes a three-way switch 141 which senses the position of the shaft 132. The switch 141 includes an arm or leaf 143 which is movable alternately into engagement with contacts 144 and 145. An actuator 146 is provided for moving the arm 143 and the actuator engages cam lobes conveniently formed on the crank wheel 82. The crank wheel is movable in the direction indicated by the arrow in FIGURE 8 and includes alternate lobes and wells 148, 149, 150 and 151. The shape and length of the respective lobes and wells determines the distance through which the stem is reciprocated during subsequent actuations of the drive motor 136 and may vary somewhat for valves having different operational sequences. The armature 143 of the switch 141 is connected in a series circuit including conductor 152, valve drive motor 136 and conductor 153 to one of the power supply conductors 154. A timer mechanism, including a timer drive motor 155 and a switching mechanism, diagrammatically indicated at 156, is provided for alternately supplying power to conductors 157 and 158 connected to the contacts 144 and 145, at time intervals corresponding to the successive phases of the regeneration cycle. The switching mechanism 156 is diagrammatically shown as a three-way switch which completes a circuit through conductor 161 to the other power supply conductor 162. It is to be understood, however, that any other suitable switching and cam arrangement may be provided to accomplish the aforementioned function, namely, energization of conductors 157 and 158 alternately at time intervals corresponding to the successive phases of the regeneration cycle.

The value is shown in FIG. 1 in its service position. During the service position, the valve stem is at one end of its stroke, and, as shown in FIG. 1, the crank is at a substantially bottom dead center and the switch actuator 146 is positioned at the beginning of the cam lobe 148. The several valve elements 84–89 are axially positioned with respect to the seats so that the valve elements 84 and 85 engage the seat 47 to block the upper end of the passage in the tubular valve stem 77. In addition, valve element 86 is positioned to block the seat 40 to prevent the flow of raw water to service and the valve element 88 blocks the seat 48 to prevent flow to drain. Thus, in the service position, the port 36 is open so that the pressures on the inlet and outlet of the ejector 22 are substantially equalized and no flow occurs through the ejector. Raw water from the inlet 31 flows through port 36 to the first tank compartment 33 and then through line 35 to the upper end of the treatment tank. The treated water from the lower end of the treatment tank flows to the second tank compartment 41 and through the open port 44 to the service compartment 38 and out to the service line.

Figure 3:
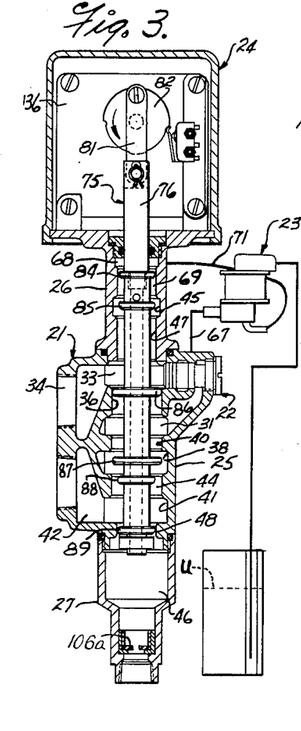
FIGURES 3, 4 and 5 are longitudinal sectional views through the valve and respectively illustrating the same in its backwash, regeneration, and rapid rinse positions.

The valve is movable axially from the service position to a backwash position in which the valve member is at the other extreme end of its stroke, as shown in FIG. 3. As best shown in FIG. 8, the cam lobe 148 on the crank wheel 82 is dimensioned to extend through an arc of approximately 180 degrees. When it is time to regenerate the softener, the timer operates the switch mechanism 156 to apply power to the conductor 157 and complete a circuit to the valve drive motor 136 by way of contact 144 and arm 143. The arm 143 maintains the circuit to the drive motor until the cam has rotated through substantially 180 degrees to move the valve member to its fully raised position. At that time, the actuator 146 drops off the cam lobe 148 and into the cam well 149 to thereby move the arm 143 out of engagement with the contact 144 and into engagement with the contact 145. This stops the valve drive motor with the valve member in its fully raised position, as shown in FIG. 3. In that position, the valve element 84 spans the seat 69 above the first drain compartment 45 and the valve element 86 spans the seat 36 between the inlet compartment 31 and the first tank compartment 33. In addition, the valve element 89 spans the seat 48 between the second tank compartment 41 and the second drain compartment 46 to block flow from the second tank compartment to the second drain compartment. Thus, in the backwash position, the seat 40 is open so that water from the supply inlet can flow to the service outlet 39 and, in addition, the seat 44 is also open so that the raw water can pass to the second tank compartment 41 and through line 43 to the bottom of the treatment tank. The effluent from the top of the treatment tank flows through line 35 to the first tank compartment 33 and through seat 47 to the lateral opening 105 in the upper end of the stem. The effluent then flows down through the stem and through the second drain compartment 46 to the drain line 106. The flow controller 106a is selected to maintain a pre-selected backwash rate which is selected according to tank size to raise and loosen the bed B of exchange material in the tank 10.

Figure 4:
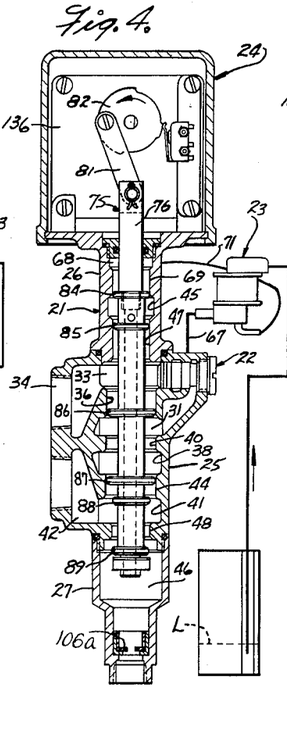

After a suitable time interval, the timer operates the switch mechanism diagrammatically indicated at 156 to apply power to the conductor 158. This completes a circuit to the valve drive motor through contact 145 and arm 143 of the valve switch. The valve stem is then moved downwardly to its regeneration position shown in FIG. 4. The regeneration position is approximately midway between the service and backwash positions, and the well portion 149 of the cam is arranged to extend to approximately ¼ turn, shown in FIG. 8 as about 80°. When the valve stem reaches its regeneration position, the cam lobe 150 operates the actuator 146 to move the arm 143 out of engagement with contact 145 and into engagement with contact 144, to thereby stop the valve drive motor. In the regeneration position, shown in FIG. 4, valve element 85 spans the seat 47 to block flow to the upper drain chamber and valve element 84 spans the seat 69 to block communication between the upper drain chamber and the refill compartment 68. In addition, valve element 86 spans the seat 36 between the inlet compartment and the first tank compartment and valve element 87 spans the seat 44 between the service compartment and the second tank compartment. Raw water from the inlet compartment then flows to the inlet of the ejector 22 and through the ejector to the first tank compartment and then to the upper end of the treatment tank 10. Fluid from the bottom of the treatment tank flows through conduit 43 to the second tank compartment 41 and through port 48 to the second drain compartment 46. As the water flows through the ejector 22, it draws regenerant in from the regenerant tank until the level of the regenerant tank drops to level L at the lower end of the regenerant line 15. At that time, air is drawn into line 15 and into the float chamber FC so that the float member 110 moves downwardly against the seat to block flow of air to the ejector. The flow of water to the inlet 62 of the ejector is preferably continued for a further time interval to allow a slow rinse of the bed of exchange material.

Figure 5:
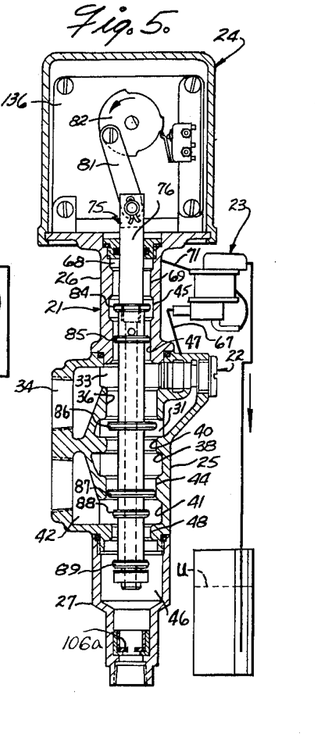

After a time interval corresponding to the duration of the regeneration and slow rinse phases of the regeneration cycle, the timer mechanism operates the switch mechanism designated 156 to again apply power to the conductor 157. This establishes a circuit to the valve drive motor to move the valve member to its rapid rinse position. As shown in FIG. 5, the rapid rinse position is spaced axially downwardly a slight distance from the regeneration position and the cam lobe 150 on the crank wheel 82 is dimensioned to maintain the motor energized until the valve member reaches its rapid rinse position. In the rapid rinse position, the valve element 85 spans the seat 47 to block flow from the first tank compartment to the first drain compartment. However, the valve member 84 is spaced axially from the seat 69 so that the lateral passage 105 in the valve stem is in communication with the refill compartment. In the rapid rinse position, valve element 87 also spans the seat 44 to block flow between the second tank compartment and the service compartment. Thus, in the rapid rinse position, water flows from the inlet compartment 31 through seat 36 to the first tank connecting compartment 33 and then to the top of the treatment tank. The fluid from the bottom of the treatment tank flows through the second tank compartment 41 and through port 48 to the second drain compartment. As previously described, the flow controlling device 106a maintains a substantially constant rate of flow through the drain line to thereby also control the rapid rinse flow. This flow controller, located in the drain line, proivdes a back pressure during the rapid rinse phase and forces some of the fluid from the second drain compartment up through the tubular stem and through the refill compartment 68 to the regenerant control valve 23. The fluid flowing to the regenerant control valve refills the same and then refills the tank through the regenerant line 15. The timer mechanism times the duration of the rapid rinse phase and the flow control device 115 in the regenerant control valve functions to maintain a substantially constant flow to the regenerant during the rapid rinse phase of the regeneration cycle to thereby introduce a preselected quantity of liquid into the regenerant tank. The flow control device 115 is sized according to the amount of liquid regenerant to be used during each regeneration cycle and the size of the orifice in the control device is correlated with the duration of the rapid rinse phase of the regeneration cycle so as to pass an amount of liquid back into the regenerant tank to provide the right amount of liquid regenerant for a subsequent regeneration cycle. This provides the same quantity of liquid regenerant for each succeeding regeneration cycle, independent of the level of the solid regenerant in the regenerant tank. With this arrangement, wherein th rapid rinse water is utilized to refill the regenerant tank, it is apparent that only water that has been filtered by passage through the bed of exchange material is passed into the regenerant tank. In addition, the rapid rinse of the exchange material is utilized primarily to remove the excess regenerant from the bed of exchange material. Some of this excess regenerant is thus passed back into the regenerant tank with the rapid rinse water to provide more economical use of the regenerant.

At the end of the rapid rinse phase, the timer operates the switch designated 156 and applies power to conductor 158. This completes a circuit to the timer drive motor 155 through contact 145 and armature 143 and operates the motor 136 until the cam lobe 148 again moves the armature 143 away from contact 145 and into engagement with contact 144. This stops the valve drive motor until timer mechanism again applies power to conductor 158 at the beginning of a subsequent regeneration cycle.

We claim:
1. In a flow control system for use with a water treatment apparatus having a treatment tank and a regenerant tank, the combination comprising;
   an ejector having a raw water inlet, a regenerant inlet, and an ejector outlet;
   a regenerant control valve means defining a float chamber and having a regenerant line communicating with the float chamber and adapted for communicating with the regenerant tank, a regenerant feed passage communicating with the float chamber and with the regenerant inlet of the ejector, and a refill passage for supplying liquid to the float chamber and to the regenerant line;
   an air check float member in said float chamber operable to close said regenerant feed passage and block flow of regenerant from the float chamber when the liquid in the float chamber drops to a pre-selected level;
   check valve means in said regenerant feed passage operable to open for flow from the float chamber and to close to prevent return flow;
   a main valve means connected to said raw water inlet and said outlet of said ejector and having a supply inlet, a treated water outlet, first and second tank connecting passages adapted for connection to a treatment tank, a drain outlet and a regenerant tank refill port connected to said regenerant refill passage;
   said main valve means including valve elements movable to different positions and operable in one position to pass fluid from the supply inlet to the raw water inlet of the ejector and to pass fluid from the outlet of the ejector to one of said tank connecting passages, said main valve means including means operable in one other position of said valve elements to pass fluid to said refill port to refill the regenerant tank;
   and timer controlled means for moving said valve elements between said different positions operable to control the time during which said elements are in said one other position to regulate refill of the regenerant tank.

2. The combination of claim 1, including a pressure responsive flow control device in said refill passage for maintaining a pre-selected generally uniform rate of flow therethrough.

3. In a flow control system for use with a water treatment apparatus having a treatment tank and a regenerant tank, the combination comprising;
   an ejector having a raw water inlet, a regenerant inlet, and an ejector outlet;
   a regenerant control valve means defining a float chamber and having a regenerant line communicating with the float chamber and adapted for communication with the regenerant tank, a regenerant feed passage communicating with the float chamber and with the regenerant inlet of the ejector, and a refill passage for supplying liquid to the float chamber and to the regenerant line;
   an air check float member in said float chamber operable to close said regenerant feed passage and block flow of regenerant from the float chamber when the liquid in the float chamber drops to a pre-selected level;

check valve means in said regenerant feed passage operable to open for flow from the float chamber and to close to prevent return flow;

a main valve means connected to said raw water inlet and said outlet of said ejector and having a supply inlet, a treated water outlet, first and second tank connecting passages adapted for connection to a treatment tank, a drain outlet and a regenerant tank refill port connected to said regenerant refill passage;

said main valve means including a valve member reciprocable to different positions and having a plurality of valve elements thereon operable in one position of the valve member to pass fluid from the supply inlet to the raw water inlet of the ejector and to pass fluid from the outlet of the ejector to one of said tank connecting passages, said main valve means including means operable in one other position of said valve elements to pass fluid to said refill port to refill the regenerant tank;

and timer controlled means for moving said valve member between said different positions operable to control the time during which said valve member is in said one other position to regulate refill of the regenerant tank.

4. In a flow control system for use with a water treatment apparatus having a treatment tank and a regenerant tank, the combination comprising;

an ejector having a raw water inlet, a regenerant inlet, and an ejector outlet;

a regenerant control valve means defining a float chamber and having a regenerant line communicating with the float chamber and adapted for communication with the regenerant tank, a regenerant feed passage communicating with the lower end of the float chamber and with the regenerant inlet of the ejector, and a refill passage for supplying liquid to the float chamber and to the regenerant line;

said regenerant feed passage having a valve seat at the lower end of the float chamber, an air check float member in said float chamber cooperable with said seat to close said regenerant feed passage and block flow of regenerant from the float chamber when the liquid in the float chamber drops to a pre-selected level;

check valve means in said regenerant feed passage operable to open for flow from the float chamber and to close to prevent return flow, said refill passage communicating with said regenerant feed passage at a point intermediate said check valve and said valve seat;

a main valve means connected to said raw water inlet and said outlet of said ejector and having a supply inlet, a treated water outlet, first and second tank connecting passages adapted for connection to a treatment tank, a drain outlet and a regenerant tank refill port connected to said regenerant refill passage;

said main valve means including valve elements movable to different positions and operable in one position to pass fluid from the supply inlet to the raw water inlet of the ejector and to pass fluid from the row water outlet of the ejector to one of said tank connecting passages, said main valve means including means operable in one other position of said valve elements to pass fluid from the other of said tank connecting passages to said refill port to refill the regenerant tank;

and timer controlled means for moving said valve elements between said different positions operable to control the time during which said elements are in said one other position to regulate refill of the regenerant tank.

5. In a flow control system for use with a water treatment apparatus having a treatment tank and a regenerant tank, the combination comprising;

an ejector having a raw water inlet, a regenerant inlet, and an ejector outlet;

a regenerant control valve means defining a float chamber and having a regenerant line communicating with the float chamber and adapted for communication with the regenerant tank, a regenerant feed passage communicating with the float chamber and with the regenerant inlet of the ejector, and a refill passage for supplying liquid to the float chamber and to the regenerant line;

an air check float member in said float chamber operable to close said regenerant feed passage and block flow of regenerant from the float chamber when the liquid in the float chamber drops to a pre-selected level;

check valve means in said regenerant feed passage operable to open for flow from the float chamber and to close to prevent return flow;

a main valve means connected to said raw water inlet and said outlet of said ejector and having a supply inlet, a treated water outlet, first and second tank connecting passages adapted for connection to a treatment tank, a drain outlet, and a regenerant tank refill port connected to said regenerant refill passage;

said main valve means including a valve member movable between service, backwash, regeneration, and rapid rinse positions;

said valve member being operable in said service position to pass fluid from said supply inlet to said first tank connecting passage and to pass fluid from said second tank connecting passage to said treated water outlet, operable in said backwash position to pass fluid from the supply inlet to second tank connecting passage and to pass fluid from said first tank connecting passage to said drain outlet, operable in said regeneration position to pass fluid from said supply inlet to the raw water inlet of the ejector and to pass fluid from the outlet of the ejector to said first tank connecting passage and to pass fluid from said second tank connecting passage to said drain outlet, and operable in said rapid rinse position to pass fluid from said supply inlet to said first tank connecting passage and to pass fluid from the second tank connecting passage to drain and to said refill port;

said drain passage having a flow restrictor therein sufficient to divert a portion of the fluid from the second tank connecting passage to said refill port when the valve member is in said rapid rinse position;

and timer controlled means for moving said valve member between said different positions and operable to control the time during which said valve member is in said rapid rinse position to regulate refill of the regenerant tank.

6. The combination of claim 5, including a pressure-responsive flow control device in said refill passage for maintaining a pre-selected generally uniform rate of flow therethrough.

7. In a flow control system for use with a water treatment apparatus having a treatment tank and a regenerant tank, the combination comprising;

an ejector having a raw water inlet, a regenerant inlet, and an ejector outlet;

a regenerant control valve means defining a float chamber and having a regenerant line communicating with the float chamber and adapted for communication with a regenerant tank, a regenerant feed passage communicating with the float chamber and with the regenerant inlet of the ejector, and a refill passage for supplying fluid to the float chamber and to the regenerant line;

an air check float member in said float chamber operable to close said regenerant feed passage and block flow of regenerant from the float chamber when the liquid in the float chamber drops to a pre-selected level;

check valve means in said regenerant feed passage operable to open for flow from the float chamber and to close to prevent return flow;

a main valve casing defining an elongated valve chamber having a supply inlet, a treated water outlet, first and second tank connecting passages adapted for connection to a treatment tank, a drain outlet, and a regenerant tank refill port connected to said regenerant refill passage, said casing having passage means connecting said raw water inlet of said ejector to said supply inlet and passage means connecting said outlet of said ejector to said first tank connecting passage;

an elongated valve member in said chamber including a stem and a plurality of valve elements on said stem movable therewith between a service, backwash, regeneration and rapid rinse position;

said valve means being operable in said service position of said valve member to pass fluid from said supply inlet to said first tank connecting passage and to pass fluid from said second tank connecting passage to said treated fluid outlet, operable in said backwash position to pass fluid from said supply inlet to second tank connecting passage and to pass fluid from said first tank connecting passage to said drain outlet, operable in said regenerating position to pass fluid from said supply inlet through the ejector to said first tank connecting passage and to pass fluid from the second tank connecting passage to said drain outlet, and operable in said rapid rinse position to pass fluid from said supply inlet to said first tank connecting passage and to pass fluid from said second tank connecting passage to said drain outlet;

said valve stem having a passage therein and said valve means including means operable in said rapid rinse position to pass fluid through said passage in said valve stem to said refill port when said valve member is in said rapid rinse position;

and timer controlled means for moving said valve member between said different positions and operable to control the time during which said valve member is in said rapid rinse position to regulate refill of the regenerant tank.

8. In a flow control system for use with a water treatment apparatus having a treatment tank and a regenerant tank, the combination comprising;

an ejector having a raw water inlet, a regenerant inlet, and an ejector outlet;

a regenerant control valve means defining a float chamber and having a regenerant line communicating with the float chamber and adapted for communicating with the regenerant tank, a regenerant feed passage communicating with the float chamber and with the regenerant inlet of the ejector, and a refill passage for supplying liquid to the float chamber and to the regenerant line;

an air check float member in said float chamber operable to close said regenerant feed passage and block flow of regenerant from the float chamber when the liquid in the float chamber drops to a pre-selected level;

check valve means in said regenerant feed passage operable to open for flow from the float chamber and to close to prevent return flow;

a main valve casing defining an elongated valve chamber having a supply inlet, a treated water outlet, first and second tank connecting passages adapted for connection to a treatment tank, a drain outlet and a regenerant tank refill port connected to said regenerant refill passage;

said casing having passage means connecting said raw water inlet of said ejector to said supply inlet and passage means connecting said outlet of said ejector to said first tank connecting passage;

an elongated valve member in said chamber including a stem and a plurality of valve elements on said stem movable therewith between a service, backwash, regeneration and rapid rinse position;

said valve means being operable in said service position of said valve member to pass fluid from said supply inlet to said first tank connecting passage and to pass fluid from said second tank connecting passage to said treated fluid outlet, operable in said backwash position to pass fluid from said supply inlet to said second tank connecting passage and to pass fluid from said first tank connecting passage to said drain outlet, operable in said regenerating position to pass fluid from said supply inlet through the ejector to said first tank connecting passage and to pass fluid from the second tank connecting passage to said drain outlet, and operable in said rapid rinse position to pass fluid from said supply inlet to said first tank connecting passage and to pass fluid from said second tank connecting passage to said drain outlet;

said valve stem having a passage therein and said valve means including means operable to pass fluid from said second tank connecting passage through said passage in said valve stem to said refill port when said valve member is in said rapid rinse position;

and timer controlled means for moving said valve member between said different positions and operable to control the time during which said valve member is in said rapid rinse position to regulate refill of the regenerant tank.

9. In a flow control system for use with a water treatment apparatus having a treatment tank and a regenerant tank;

a main valve casing defining an elongated valve chamber having a first drain compartment, a first tank connnecting passage, a supply inlet, a service outlet, a second tank connecting passage, and a second drain compartment each communicating with said chamber at axially spaced points therealong and arranged along the chamber in the order named from one end of the chamber to the other;

an ejector having a raw water inlet communicating with said supply inlet, a regenerant inlet, and an ejector outlet communicating with said first tank connecting passage;

means on the casing defining a first valve seat between the first drain compartment and the first tank connecting passage, a second valve seat between the first tank connecting passage and the supply inlet, a third valve seat between the supply inlet and said service outlet, a fourth seat between said service outlet and said second tank connecting passage, and a fifth seat between said second tank connecting passage and said second drain compartment;

an elongated valve member including a stem and a plurality of valve elements on said stem movable therewith to four different axial positions including service, backwash, regeneration and rapid rinse positions;

said valve member being operable in said service position to block said first, third and fifth seats and to pass fluid from said supply inlet to said first tank connecting passage and to pass fluid from said second tank connecting passage to said service outlet, operable in said backwash position to block said second and fifth seats and to pass fluid from said supply inlet to said second tank connecting passage and to pass fluid from said first first tank connecting passage to said first drain compartment, operable in said regeneration position to block said first, second and fourth seats and to pass fluid from said supply inlet through said ejector to said first tank connecting passage and to pass fluid from said second tank connecting passage to said second drain compartment, and operable in said rapid rinse position to block said first and fourth seats and to pass fluid from said supply inlet to said first tank connecting passage and to pass fluid from said second tank connecting passage to said second drain compartment;

drain passage means in said valve for passing fluid from said drain compartments to drain;

and means for moving said stem between said four different axial positions.

10. In a flow control system for use with a water treatment apparatus having a treatment tank and a regenerant tank;

a main valve casing defining an elongated valve chamber having a first drain compartment, a first tank connecting passage, a supply inlet, a service outlet, a second tank connecting passage, and a second drain compartment each communicating with said chamber at axially spaced points therealong and arranged along the chamber in the order named from one end of the chamber to the other;

an ejector having a raw water inlet communicating with said supply inlet, a regenerant inlet, and an ejector outlet communicating with said first tank connecting passage;

means on the casing defining a first valve seat between the first drain compartment and the first tank connecting passage, a second valve seat between the first tank connecting passage and the supply inlet, a third valve seat between the supply inlet and said service outlet, a fourth seat between said service outlet and said second tank connecting passage, and a fifth seat between said second tank connecting passage and said second drain compartment;

an elongated valve member including a stem and a plurality of valve elements on said stem movable therewith to four different axial positions including service, backwsh, regeneration and rapid rinse positions;

said valve member being operable in said service position to block said first, third and fifth seats and to pass fluid from said supply inlet to said first tank connecting passage and to pass fluid from said second tank connecting passage to said service outlet, operable in said backwash position to block said second and fifth seats and to pass fluid from said supply inlet to said second tank connecting passage and to pass fluid from said first tank connecting passage to said first drain compartment, operable in said regeneration position to block said first, second and fourth seats and to pass fluid from said supply inlet through said ejector to said first tank connecting passage and to pass fluid from said second tank connecting passage to said second drain compartment, and operable to said rapid rinse position to block said first and fourth seats and to pass fluid from said supply inlet to said first tank connecting passage and to pass fluid from said second tank connecting passage to said second drain compartment;

a drain passage communicating with one of said drain compartments, said stem having a passage therein communicating at one end with one of said drain compartments and opening at the other end in communication with the other of said drain compartments;

and means for moving said stem between said four different axial positions.

11. In a flow control system for use with a water treatment apparatus having a treatment tank and a regenerant tank;

a main valve casing defining an elongated valve chamber having a first drain compartment, a first tank connecting passage, a supply inlet, a service outlet, a second tank connecting passage, and a second drain compartment each communicating with said chamber at axially spaced points therealong and arranged along the chamber in the order named from one end of the chamber to the other;

an ejector having a raw water inlet communicating with said supply inlet, a regenerant inlet, and an ejector outlet communicating with said first tank connecting passage;

means on the casing defining a first valve seat between the first drain compartment and the first tank connecting passage, a second valve seat between the first tank connecting passage and the supply inlet, a third valve seat between the supply inlet and said service outlet, a fourth seat between said service outlet and said second tank connecting passage, and a fifth seat between said second tank connecting passage and said second drain compartment;

an elongated valve member including a stem and a plurality of valve elements on said stem movable therewith to four different axial positions including service, backwash, regeneration and rapid rinse positions;

said valve member being operable in said service position to block said first, third and fifth seats and to pass fluid from said supply inlet to said first tank connecting passage and to pass fluid from said second tank connecting passage to said service outlet, operable in said backwash position to block said second and fifth seats and to pass fluid from said supply inlet to said second tank connecting passage and to pass fluid from said first tank connecting passage to said first drain compartment, operable in said regeneration position to block said first, second and fourth seats and to pass fluid from said supply inlet through said ejector to said first tank connecting passage and to pass fluid from said second tank connecting passage to said second drain compartment, and operable in said rapid rinse position to block said first and fourth seats and to pass fluid from said supply inlet to said first tank connecting passage and to pass fluid from said second tank connecting passage to said second drain compartment;

said casing having a regenerant refill port communicating with said valve chamber;

said valve member being operable in said service, backwash and regeneration positions to block flow to said regenerant refill port and said valve means having means operable in said rapid rinse position of said valve members to pass fluid to said regenerant refill port;

a regenerant control valve means defining a float chamber and having a regenerant line communicating with the float chamber and adapted for communication with a regenerant tank, a regenerant feed passage communicating with the float chamber and with the regenerant inlet of the ejector, and a refill passage connected to the refill port for supplying liquid to the float chamber and to the regenerant line;

an air check float member in said float chamber operable to close said regenerant feed passage and block flow of regenerant from the float chamber when the liquid in the float chamber drops to a preselected level;

check valve means in said regenerant feed passage operable to open for flow from the float chamber and to close to prevent return flow;

and means for moving said stem between said four different axial positions.

12. The combination of claim 11, wherein said means in said valve means for passing fluid to the refill port includes a passage extending through the stem on the valve member.

13. The combination of claim 11, wherein said means in said valve means for passing fluid to the refill port is operative to pass fluid from the second tank connecting passage to said refill port.

14. In a flow control system for use with a water treatment apparatus having a treatment tank and a regenerant tank;
a main valve casing defining an elongated valve chamber having a first drain compartment, a first tank connecting passage, a supply inlet, a service outlet, a second tank connecting passage, and a second drain compartment each communicating with said chamber at axially spaced points therealong and arranged along the chamber in the order named from one end of the chamber to the other;
an injector having a raw water inlet communicating with said supply inlet, a regenerant inlet, and an ejector outlet communicating with said first tank connecting passage;
means on the casing defining a first valve seat between the first drain compartment and the first tank connecting passage, a second valve seat between the first tank connecting passage and the supply inlet, a third valve seat between the supply inlet and said service outlet, a fourth seat between said service outlet and said second tank connecting passage, and a fifth seat between said second tank connecting passage and said second drain compartment;
an elongated valve member including a stem and a plurality of valve elements on said stem movable therewith to four different axial positions including service, backwash, regeneration and rapid rinse positions;
said valve member being operable in said service position to block said first, third and fifth seats and to pass fluid from said supply inlet to said first tank connecting passage and to pass fluid from said second tank connecting passage to said service outlet, operable in said backwash position to block said second and fifth seats and to pass fluid from said supply inlet to said second tank connecting passage and to pass fluid from said first tank connecting passage to said first drain compartment, operable in said regeneration position to block said first, second and fourth seats and to pass fluid from said supply inlet through said ejector to said first tank connecting passage and to pass fluid from said second tank connecting passage to said second drain compartment, and operable in said rapid rinse position to block said first and fourth seats and to pass fluid from said supply inlet to said first tank connecting passage and to pass fluid from said second tank connecting passage to said second drain compartment;
said casing having a regenerant refill port communicating with said valve chamber and spaced axially from one of said drain compartments, a sixth seat between said refill port and said one of said drain compartments;
said valve member having a valve element thereon operable in each of said service, backwash and regeneration positions to block communication between said refill port and said one of said drain compartments and operable in said rapid rinse position to open said sixth seat and communicate said refill port with said one of said drain compartments;
passage means communicating said first and second drain compartments with each other, a drain passage communicating with one of said drain compartments for passing fluid to drain and having a flow restrictor therein;
a regenerant control valve means defining a float chamber and having a regenerant line communicating with the float chamber and adapted for communication with a regenerant tank, a regenerant feed passage communicating with the float chamber and with the regenerant inlet of the ejector, and a refill passage connected to the refill port for supplying fluid to the float chamber and to the regenerant line;
an air check float member in said float chamber operable to close said regenerant feed passage and block flow of regenerant from the float chamber when the liquid in the float chamber drops to a pre-selected level;
check valve means in said regenerant feed passage operable to open for flow from the float chamber and to close to prevent return flow; and means for moving said stem between said four different axial positions.

15. In a flow control system for use with a water treatment apparatus having a treatment tank and a regenerant tank the combination comprising;
an ejector having a raw water inlet, a regenerant inlet, and an ejector outlet;
a regenerant control valve means defining a float chamber and having a regenerant line communicating with the upper end of the float chamber and adapted for communication with the regenerant tank, a regenreant feed passage communictaing with the lower end of the float chamber and with the regenerant inlet of the ejector, and a refill passage for supplying liquid to the float chamber and regenerant line;
said regenerant feed passage having a valve seat at the lower end of said float chamber, an air check float member in said float chamber cooperable with said valve seat to close said regenerant feed passage and block flow of regenerant from the float chamber when the liquid in the float chamber drops to a pre-selected level;
check valve means in said regenerant feed passage operable to open for flow from the float chamber and to close to prevent return flow;
a main valve means connected to said raw water inlet and to said outlet of said ejector and having a supply inlet, a treated water outlet, first and second tank connecting passages adapted for connection to a treatment tank, a drain outlet and a regenerant tank refill port connected to said regenerant refill passage;
said main valve means including a valve member movable to different positions and having a plurality of valve elements thereon operable in one position of the valve member to pass fluid from the supply inlet to the raw water inlet of the ejector and from the outlet of the ejector to one of said tank connecting passages, said main valve means including means operable in one other position of said valve member to pass fluid from the other of said tank connecting passages to said regenerant tank refill port to refill the regenerant tank, said refill passage communicating with said regenerant feed passage at a point intermediate said check valve means and said valve seat;
and timer controlled means for moving said valve elements between said different positions and operable to control the time during which said elements are in said one other position to regulate refill of the regenerant tank.

16. In a flow control system for use with a water treatment apparatus having a treatment tank and a regenerant tank;
a main valve casing defining an elongated valve chamber having a supply inlet, a treated water outlet, first and second tank connecting passages adapted for connection to the treatment tank, a regenerant refill port, and a drain outlet;
regenerant refill conduit means connecting the regenerant refill port to said regenerant tank;
an ejector having a raw water inlet connected to said supply inlet, a regenerant inlet, and an outlet connected to said first tank connecting passage;
an elongated valve member in said chamber including a stem and a plurality of valve elements on said stem movable therewith to four different axial positions comprising a service, backwash, regeneration and rapid rinse position; said valve member being operable in said service position to pass fluid from said supply inlet to said first tank connecting passage and to pass fluid from said second tank connecting passage to said treated fluid outlet, operable in said backwash position to pass fluid from said supply inlet to said second tank connecting passage and to pass fluid from said first tank connecting a passage to said drain outlet, operable in said regeneration position to pass fluid from said supply inlet through said ejector to said first tank connecting passage and to pass fluid from said second tank connecting passage to said drain outlet, and operable in said rapid rinse position to pass fluid from said supply inlet directly to said first tank connecting passage and to pass fluid from said second tank connecting passage to said regenerant refill port and to said drain outlet, flow restrictor means in said drain outlet to maintain sufficient pressure thereat to cause some of the fluid to flow through said refill port;

regenerant feed conduit means connecting the regenerant inlet of the ejector to said regenerant tank, check valve means associated with said regenerant feed conduit means for controlling flow therethrough and operable to open for flow from said regenerant tank when said stem is in said regeneration position and to close to prevent return flow;

and means for moving said stem between said four different axial positions.

References Cited by the Examiner

UNITED STATES PATENTS

| | | | |
|---|---|---|---|
| 3,073,346 | 1/1963 | Rudelick | 210—140 |
| 3,146,788 | 9/1964 | Mahlstedt et al. | 137—399 |

ISADOR WEIL, *Primary Examiner.*

WILLIAM F. O'DEA, *Examiner.*